United States Patent [19]

McAbery

[11] Patent Number: 4,576,335

[45] Date of Patent: Mar. 18, 1986

[54] SLIDING VALVE ASSEMBLY

[76] Inventor: Robert S. McAbery, Box 1937, Aspen, Colo. 81612

[21] Appl. No.: 595,559

[22] Filed: Mar. 30, 1984

[51] Int. Cl.[4] .................. B05B 17/00; B05B 3/18; F16L 9/14
[52] U.S. Cl. .................................. 239/1; 239/183; 138/151; 285/189
[58] Field of Search ............... 239/1, 178, 183, 184, 239/709, 711; 137/899; 285/45, 156, 189; 138/128, 151

[56] References Cited

U.S. PATENT DOCUMENTS

| 3,011,502 | 12/1961 | Jordan . | |
|---|---|---|---|
| 3,019,813 | 2/1962 | Dommann . | |
| 3,094,282 | 6/1963 | Purtell | 239/183 X |
| 3,592,220 | 7/1971 | Reinke . | |
| 3,643,867 | 2/1972 | Thietje | 239/183 |
| 3,903,917 | 9/1975 | Ede . | |
| 3,942,722 | 3/1976 | Ede | 239/183 X |
| 4,219,043 | 8/1980 | Zimmerer et al. | 239/183 X |

FOREIGN PATENT DOCUMENTS 698587 11/1979 U.S.S.R. ................. 239/183

Primary Examiner—Jeffrey V. Nase
Assistant Examiner—Mary Beth O. Jones
Attorney, Agent, or Firm—Fields, Lewis, Pittenger & Rost

[57] ABSTRACT

A sliding valve assembly is provided which has particular use in irrigating large fields. An inner resilient conduit is provided with overlapping edges which is restrained from expanding under water pressure by an outer concentric flexible cover having abutting edges positioned over the overlapping edges of the inner conduit and being opened and closed by a slide fastener. A discharge tube extends through the opening in the cover and between the overlapping flaps of the conduit and has an inner arcuate member corresponding to the contour of the conduit and a similar outer arcuate clamping member which clamped together with the flanges therebetween. The water pressure and the clamping members form a tight seal at the overlapping edges where the discharge tube extends into the conduit so that fluid within the conduit can be discharged to an appropriate point of use. The slide valve can be moved by turning off the water pressure to the line and sliding it longitudinally within the conduit, the slide fastener being movable to open and close the cover in response to movement of the sliding valve. Water pressure can then be restored to the conduit to effectuate the seal at the sliding valve and to permit discharge of water from the main line.

9 Claims, 4 Drawing Figures

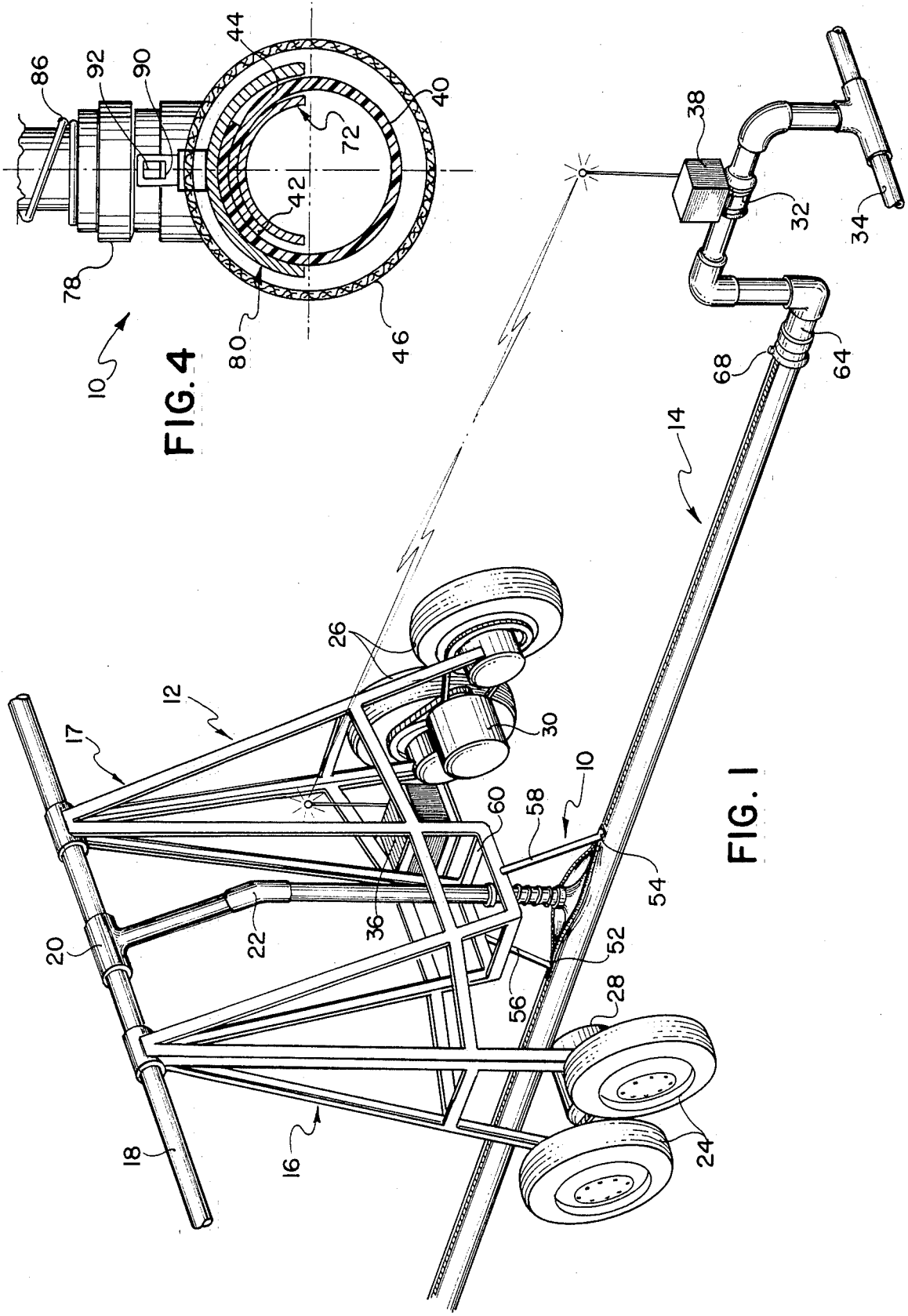

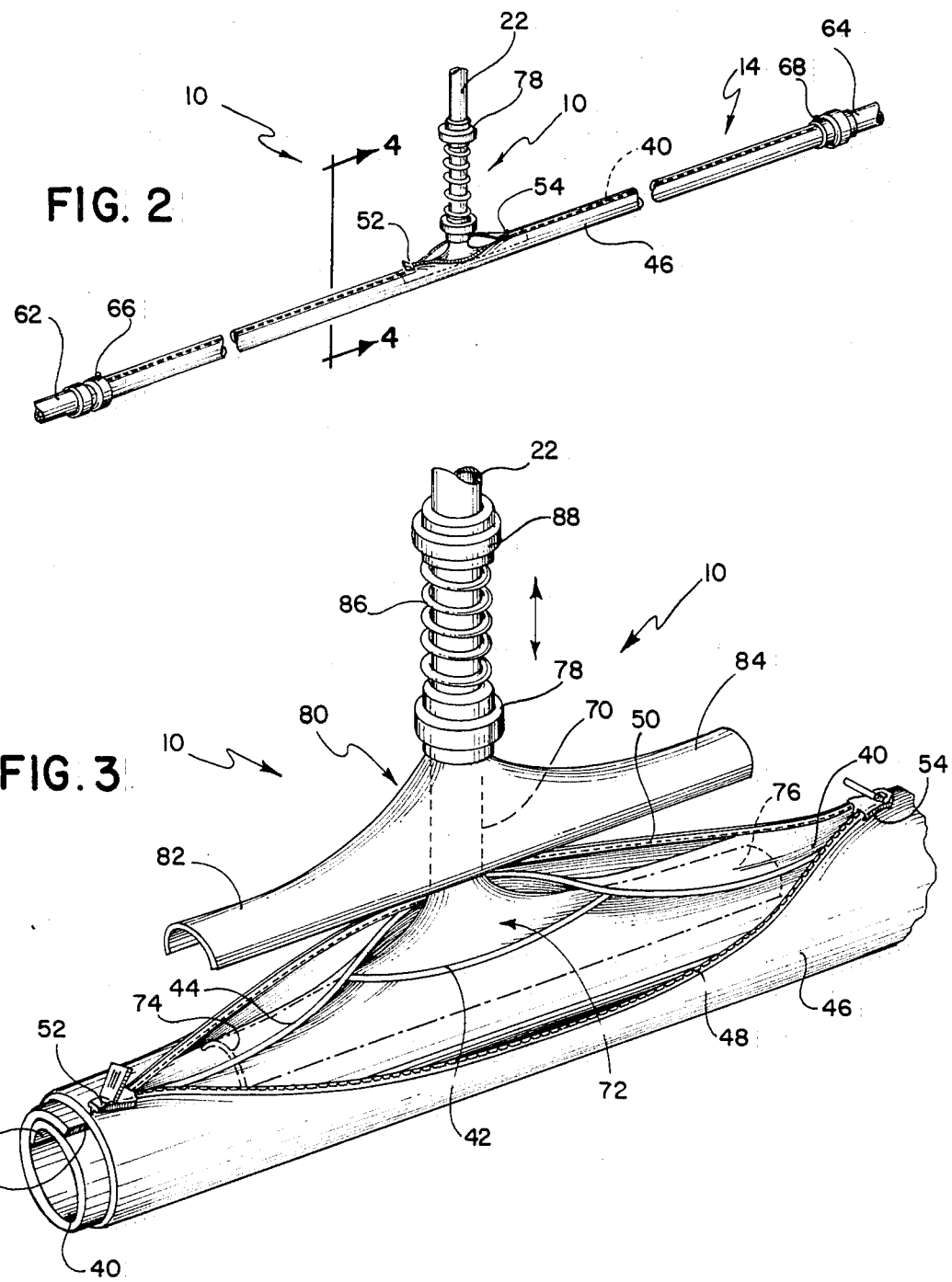

SLIDING VALVE ASSEMBLY

TECHNICAL FIELD

This invention relates to a sliding valve assembly, and more particularly to a sliding valve assembly for utilization in selectively providing irrigation water to selected rows in a field from a main pipeline.

BACKGROUND ART

In a typical field to be irrigated, a main pipeline will be provided along one side of the field. Means must then be provided for conveying the water from the main pipeline selectively down the rows of the field. One common method for accomplishing this is to provide valves spaced along the main pipeline to which lightweight movable irrigation tubing can be selectively connected. In other words, the irrigation tubing will be connecting to one valve which will be open so that the area served by this tubing can be irrigated. After irrigating that section, the valve will be closed and the tubing will be moved to the next valve and be reconnected and that valve is reconnected. Such a system is labor intensitive. In other words, significant manpower is required to continually move the irrigation tubing and reconnect it to the respective valves.

Automatic irrigating devices have been provided which are connected to a main source of irrigation water at a central pivot and move in a circular fashion around the pivot. These devices move across the rows and therefore destroy portions of them. Furthermore, they irrigate in a circular pattern whereas most fields are laid out on a rectangular pattern which leaves portions in the corners unirrigated by this type of apparatus.

Devices have also been provided which automatically move longitudinally along the main irrigation line. Typically, such devices have been unduly complex and are subject to leakage and rapid wear of interlocking elements.

One such device is illustrated in U.S. Pat. No. 3,011,502 to Jordan having a sliding Tee connection in one embodiment and a sliding elbow connection in another embodiment. The main line has a longitudinal slit which has overlapping edges which are releasably sealed together by means of interlocking flanges. As the Tee or elbow moves longitudinally along the pipe, the interlocking edges of the main line must be continually opened and closed around the moving section. If foreign matter, such as dirt, should get in between the flange, it will interfere with the interlocking mechanism. Furthermore, the interlocking flanges are subject to wear and failure, resulting in leaks.

Another sliding valve arrangement is shown in U.S. Pat. No. 4,219,043 to Zimmerer, et al. This device also constitutes a Tee member which moves longitudinally in a main pipeline and extends through a longitudinal slit in the main pipeline which is releasably opened and closed as the device moves along. The device is subject to the same shortcomings mentioned above with respect to the Jordan patent.

Another slidable valve is shown in U.S. Pat. No. 3,019,813 to Dommann. This valve arrangement includes a separate sealing strip which releasably and sealingly engages the longitudinal slit in the main waterline. A device is provided along with a Tee connection which selectively opens and seals the longitudinal slit in the pipe as the valve moves therealong.

Still another sliding valve is shown in U.S. Pat. No. 3,592,220 to Reinke wherein the longitudinal slit in the main supply pipe has overlapping edges which can be separated by a shoe which forms a part of the Tee connection and allows the water to pass from the main supply through an outlet on the Tee.

U.S. Pat. No. 3,643,867 to Thietje discloses yet another movable valve wherein a longitudinal slit in the main irrigation pipe is closed by a longitudinal sealing member which is held in place by the water pressure within the pipe and is deflected by a device moving along the pipe to allow water from the main pipe to be transmitted to auxiliary transverse pipes extending into the field.

U.S. Pat. No. 3,903,917 to Ede discloses another irrigation system wherein the main pipeline has a longitudinal slit along the top which is closed by interlocking lips and can be selectively opened and closed in response to a movement of a slidable valve therein.

DISCLOSURE OF THE INVENTION

In accordance with this invention, a sliding valve assembly for use in selectively distributing fluids from a main fluid supply line has been provided. The assembly includes a main fluid supply line having a resilient conduit with normally overlapping longitudinal edges through which a main supply of fluid is flowable. Means are provided for normally retaining the overlapping edges of the conduit in overlapped condition when under internal fluid pressure from the fluid flowing through the conduit. A discharge tube is provided which has a distal end that separates the overlapping edges of the supply line and extends therebetween for discharging fluid from the supply line. The discharge tube is selectively movable along the supply line and the overlapping edges are selectively separated by the discharge tube as it is moved therealong. Means are provided for forming a releasable seal between the discharge tube and the supply line which forms a fluid-tight seal during discharge of fluid through the discharge tube and releases to permit movement of the discharge tube along the supply line.

More specifically, the invention contemplates that the retaining means is a cylindrical outer flexible cover generally coaxial with and surrounding the conduit. The cover has facing longitudinal edges generally aligned with the overlapping portions of the edges of the resilient conduit. The releasable sealing means includes a first arcuate member connected to the distal end of the discharge tube, the first member having oppositely extending curved legs which generally conform to the curve of the conduit and are positionable in the conduit to direct fluid within the conduit to the discharge tube. A second arcuate member is arranged in nesting arrangement over the outer portion of the first member, the second member being a sleeve with oppositely curved legs corresponding generally in shape and length to the legs of the first member. The sleeve is slidable along the discharge tube for nesting against the first member with the overlapping edges of the conduit therebetween. Additionally, means are provided for holding the first and second members in nesting position to clamp the conduit flanges therebetween to form a seal to prevent leakage of water. Finally, a releasible closure in the form of a zipper is movable along the cover in conjunction with movement of the discharge tube to close the cover except at the location of the discharge tube.

It will be understood that by utilizing this invention a very simple slide valve construction has been provided which allows for intermittent movement of the slide valve for selectively irrigating a field.

Additional advantages of the invention will be apparent from the description which follows, taken in conjunction with the accompanying drawings.

BRIEF DESCRIPTION OF THE DRAWINGS

FIG. 1 is a perspective view showing the sliding valve of this invention mounted for movement with a central tractor or drive tower;

FIG. 2 is a fragmentary perspective view of the slide valve of this invention;

FIG. 3 is an enlarged perspective view of this invention with the sealing means shown in separated condition; and FIG. 4 is an enlarged vertical section, taken along line 4—4 of FIG. 2 showing further details of the slide valve.

BEST MODE FOR CARRYING OUT THE INVENTION

The slide valve assembly 10 of this invention is shown in FIG. 1 as mounted on a central tractor or drive tower 12, which straddles and moves parallel to a main fluid or water supply line 14. The drive tractor includes a pair of spaced means supports 16 and 17 for carrying a transverse waterline 18 which may be connected to a sprinkler system. The transverse waterline is connected, as by Tee 20 to a discharge line 22 connected to the outlet of slide valve assembly 10. The supports 16 and 17 are respectively supported for movement along main waterline 14 by wheels 24 and 26 respectively. These wheels may be driven, as by motors 28 and 30, respectively.

The flow of water to main line 14 can be controlled by means of a valve 32 connected to a supply line 34. During movement of slide valve 10, the water in main water line 14 must be shut off so that there is no water pressure to inhibit movement of the slide valve, as will be explained more fully below. In order to shut the water off, a timer 36 can be provided which includes a radio transmitter for transmitting a signal to remote control 38 of control valve 32 for intermittently shutting off the water pressure during movement of drive tractor 12 and slide valve assembly 10.

The main supply line includes an inner resilient conduit which has normally overlapping edges 42 and 44. A cylindrical outer flexible cover or sleeve 46 extends around and is generally coaxial with conduit 40. Cover 46 includes abutting edges having interlocking teeth 48 on one edge which cooperate with interlocking teeth 50 on the other edge and are interlocked and separated, respectively, by slide fasteners 52 and 54. It will be apparent as the slide valve assembly 10 is moved along main waterline 14, cover 46 will be sequentially opened and closed by the slide fasteners moving adjacent thereto. In FIG. 1, arms 56 and 58 are illustrated as extending from a frame member 60 and having their extending ends connected to the slide fasteners for moving them with the slide valve assembly 10.

Conveniently, the ends of sleeve or cover 46 are held in watertight engagement with end connecting pipes 62 and 64 by means of clamps 66 and 68, as seen in FIG. 2.

The slide valve includes a discharge tube 70 having a first arcuate clamping member 72, with oppositely extending curved legs 74 and 76, connected to the lower end thereof. The arcuate shape of legs 74 and 76 corresponds to the curvature of inner conduit 40 and is adapted to be received therein. A sleeve 78 is slidably mounted on discharge tube 70 and has an has an arcuate member 80 connected to its lower end, which corresponds in shape to arcuate member 72 and has curved ends 82 and 84 that correspond in curvature and position to curved member 74 and 76. Conveniently, a coil spring 86 is mounted on discharge tube 70 and has one end which engages sleeve 78 and an opposite end which engages collar 88 which is fixedly mounted on the end of the discharge tube 70. Thus, the spring 86 urges arcuate clamping member 80 down against the overlapping edges 42 and 44 of conduit 40 so as to provide a watertight seal between the flanges where the discharge tube is inserted. It will be understood that slide fasteners 52 and 54 are shown in a more separated position than normally would be the case in order to show the arrangement of the elements of the slide valve assembly. Conveniently, sleeve 78 is provided with a notch at each side, such as notch 90, best seen in FIG. 4 which is aligned with a rib 92 on the clamping member and discharge tube so as to maintain proper alignment of clamping member 80 with clamping member 72.

In operation, it can be understood that when water pressure is in main waterline 14, the water pressure together with the clamping elements 72 and 80 will form a tight seal for the slide valve and will permit the transference of water from main line 14 through discharge 70 to discharge line 22 and finally to transverse water lines 18 which may be connected to a sprinkler system, as discussed above. When it is desired to move the slide valve to another location, the control valve 32 must be closed to relieve the water pressure in main line 14, whereupon the slide valve can be moved longitudinally along the main line by releasing the clamping member 72 and 80 from each other and sliding the mechanism along conduit 40 to a new location where they are then brought into intimate contact. During the moving operation, slide fasteners 52 and 54 may be moved therewith to sequentially open and close outer cover 46. When the new location has been reached, the control valve 32 can be opened so as to again pressurize main line 14 and provide water to the sprinkler system or other point of use. As discussed above with respect to FIG. 1, this method of moving may be done automatically and one possible system for such automatic movement of the slide valve is disclosed in FIG. 1 as has been discussed above.

It can be seen that the invention is of simple, and therefore, low cost construction which is highly efficient in operation. There is relatively little wear to the parts during movement, which provides for long life. Furthermore, there are no complex mechanisms required. Also, a watertight seal is provided which wherein the pressure of the water together with the clamping members cooperate to form the seal.

This invention has been described in detail with particular reference to preferred embodiments thereof, but it will be understood that variations and modifications can be effected within the spirit and scope of the invention.

What is claimed is:

1. A sliding valve assembly for use in selectively distributing fluids from a main fluid supply line, said assembly including:
   a main fluid supply line having a resilient conduit, with normally overlapping longitudinal edges, through which a main supply of fluid is flowable;
   concentric constraining means for normally retaining said overlapping edges of said conduit in overlapped condition when under internal fluid pressure from the fluid through said conduit;
   a discharge tube having a distal end for separating said overlapping edges of said supply line and extending therebetween for discharging fluid from said supply line, said discharge tube being selectively movable along said supply line and said overlapping edges being selectively separated by said discharge tube as it is moved along said supply line; and
   means forming a fluid-tight seal between said discharge tube and said supply line which is releasable to permit movement of said discharge tube along said supply line.

2. Apparatus, as claimed in claim 1, wherein said constraining means includes:
   a cylindrical outer flexible cover which is generally coaxial with and surrounds said conduit and has facing longitudinal edges generally aligned with said overlapping portion of said edges of said resilient conduit; and
   slide fastener means for holding said facing edges of said cover in abutting relationship.

3. Apparatus, as claimed in claim 2, wherein said slide fastener means comprises:
   a zipper movable along said cover in conjunction with the movement of said discharge tube to close said cover except at the location of said discharge tube.

4. Apparatus, as claimed in claim 2, further including:
   means at opposite ends of said cover for securing it in fluid-tight relationship to rigid pipe section.

5. Apparatus as claimed in claim 1, wherein said releasable sealing means includes:
   a first arcuate member connected to said distal end of said discharge tube, said first member having oppositely extending curved legs which generally conform to the curve of said conduit and are positionable in said conduit to direct fluid within said conduit to said discharge tube;
   a second arcuate member arranged in nesting arrangement over the outer portion of said first member, said second member having a sleeve with oppositely curved legs corresponding generally in shape and length to said legs of said first member, said sleeve being slidable along said discharge tube for nesting against said first member with said overlapping edges of said conduit therebetween; and
   means for holding said first and second members in nesting position to clamp said conduit flanges therebetween to form a seal to prevent leakage of the fluid.

6. Apparatus, as claimed in claim 5, wherein said holding means includes:
   a collar fixedly attached to said discharge tube and spaced from said distal end; and
   a coil spring surrounding said discharge tube and extending between said sleeve and said collar.

7. A sliding valve assembly for use in selectively watering a field from a fluid supply line extending across the field, said assembly including:
   a main water supply line having a resilient conduit, with normally overlapping longitudinal edges, through which a main supply of water is flowable;
   a discharge tube having a distal end for separating said overlapping edges of said supply line and extending therebetween for discharging water from said supply line, said discharge tube being selectively movable along said supply line and said overlapping edges being selectively separated by said discharge tube as it is moved along said supply line;
   a cylindrical outer flexible cover generally coaxial with and surrounding said conduit, said cover having facing longitudinal edges generally aligned with the overlapping portion of said edges of said resilient conduit;
   a first arcuate member connected to said distal end of said discharge tube, said first member having oppositely extending curved legs which generally conform to the curve of said conduit and are positionable in said conduit to direct fluid within said conduit to said discharge tube;
   a second arcuate member arranged in nesting arrangement over the outer portion of said first member, said second member having a sleeve with oppositely curved legs corresponding generally in shape and length to said legs of said first member, said sleeve being slidable along said discharge tube for nesting against said first member with said overlapping edges of said conduit therebetween;
   means for holding said first and second members in nesting position to clamp said conduit flanges therebetween to form a seal to prevent leakage of the fluid; and
   a zipper movable along said cover in conjunction with the movement of said discharge tube to close said cover except at the location of said discharge tube.

8. A method of irrigating a field comprising the steps of:
   placing a main water supply line across the field to be irrigated, which supply line has a slide valve with a discharge tube for movement along the supply line for selectively irrigating different portions of the field,
   said supply line having an inner water-carrying resilient conduit with normally overlapping longitudinal edges and a cylindrical outer flexible cover which is generally coaxial with and surrounds the conduit and has facing longitudinal edges generally aligned with the overlapping portion of the conduit edges, the cover having slide fastener means to hold the facing edges of the cover in abutting relationship to normally prevent separation of the overlapping edges of the conduit, the discharge tube extending between the overlapping edges for the discharge of water from the main supply line into the field;
   flowing water through the supply line and into the field through the discharge tube;
   retraining the overlapping edges together adjacent the discharge tube during flow of water through the supply line by said cover;
   periodically interrupting the flow of water through the supply line;

releasing the overlapping edges during interruption of the flow of water by movement of the slide fastener means along said cover; and moving the slide valve and discharge tube along the supply line an incremental distance each time the flow of water through the supply line is interrupted.

9. A method of irrigating a field comprising the steps of:

placing a main water supply line across the field to be irrigated, which supply line has a slide valve with a discharge tube for movement along the supply line for selectively irrigating different portions of the field, said supply line having an inner water-carrying resilient conduit with normally overlapping longitudinal edges and a cylindrical outer flexible cover which is generally coaxial with and surrounds the conduit and has facing longitudinal edges generally aligned with the overlapping portion of the conduit edges, the cover having slide fastener means to hold the facing edges of the cover in abutting relationship to normally prevent separation of the overlapping edges of the conduit, the discharge tube extending between the overlapping edges for the discharge of water from the main supply line into the field;

flowing water through the supply line and into the field through the discharge tube;

clamping the overlapping edges together adjacent the discharge tube during flow of water through the supply line;

periodically interrupting the flow of water through the supply line;

releasing the overlapping edges during interruption of the flow of water;

moving the slide valve and discharge tube along the supply line an incremental distance each time the flow of water through the supply line is interrupted; and moving the slide fastener means when moving the slide valve and discharge tube to selectively open and close the abutting edges of the cover adjacent the discharge tube.

* * * * *